US011782458B2

(12) United States Patent
Romanucci

(10) Patent No.: US 11,782,458 B2
(45) Date of Patent: Oct. 10, 2023

(54) PARCEL DEPLOYING APPARATUS AND VEHICLE DELIVERY

(71) Applicant: Rebecca Romanucci, Scottsdale, AZ (US)

(72) Inventor: Rebecca Romanucci, Scottsdale, AZ (US)

(*) Notice: Subject to any disclaimer, the term of this patent is extended or adjusted under 35 U.S.C. 154(b) by 595 days.

(21) Appl. No.: 16/896,814

(22) Filed: Jun. 9, 2020

(65) Prior Publication Data

US 2020/0393854 A1 Dec. 17, 2020

Related U.S. Application Data

(60) Provisional application No. 62/873,892, filed on Jul. 13, 2019, provisional application No. 62/861,960, filed on Jun. 14, 2019.

(51) Int. Cl.

| *G05D 1/12* | (2006.01) |
| *G05D 1/00* | (2006.01) |
| *G06Q 50/28* | (2012.01) |
| *G05B 19/41* | (2006.01) |
| *B60P 3/00* | (2006.01) |
| *G05B 19/4155* | (2006.01) |

(52) U.S. Cl.
CPC ............... *G05D 1/12* (2013.01); *B60P 3/007* (2013.01); *G05B 19/4155* (2013.01); *G05D 1/0088* (2013.01); *G06Q 50/28* (2013.01); *G05B 2219/40449* (2013.01)

(58) Field of Classification Search
CPC ......... G05D 1/12; G05D 1/0088; B60P 3/007; G05B 19/4155; G05B 2219/40449; G06Q 50/28

See application file for complete search history.

(56) References Cited

U.S. PATENT DOCUMENTS

| 9,688,489 | B1* | 6/2017 | Zevenbergen | ............ B25J 11/00 |
| 9,990,684 | B2* | 6/2018 | Hejazi | .................... G06Q 50/32 |
| 10,028,606 | B1* | 7/2018 | Ritchie | ............. G07C 9/00912 |
| 10,039,401 | B1* | 8/2018 | Romanucci | .......... A47G 29/141 |
| 11,151,825 | B1* | 10/2021 | Carter | ................. H04W 12/069 |
| 2018/0330313 | A1* | 11/2018 | Clarke | ................... G06Q 10/08 |

(Continued)

*Primary Examiner* — Saul Rodriguez
*Assistant Examiner* — Ashley K Romano
(74) *Attorney, Agent, or Firm* — PARSONS & GOLTRY; Robert A. Parsons; Michael W. Goltry

(57) ABSTRACT

Parcel deploying apparatus including package receiving and/or delivering apparatus defining an enclosure and any or all walls of the enclosure being releasably locked to the package receiving or deploying apparatus by an externally controllable locking mechanism and movable from a closed to an open orientation defining a package receiving flat surface. A robot including a body with controllably movable apparatus for aligning movements, the body including a wall releasably attached to the body for movement between a body closing orientation and a horizontal orientation defining a package receiving flat surface. One of the enclosure and the body including package relocating apparatus which moves a package between a stored and an extended orientation on one of the flat surfaces. The controllably movable apparatus controllable to move the robot into alignment with a delivery position. The package receiving and/or delivering apparatus and the robot can be integrated into a single robosafe.

13 Claims, 13 Drawing Sheets

(56) References Cited

U.S. PATENT DOCUMENTS

| | | | |
|---|---|---|---|
| 2018/0330319 A1* | 11/2018 | Liang | G06Q 10/08355 |
| 2018/0330325 A1* | 11/2018 | Sibley | B66F 9/063 |
| 2019/0031075 A1* | 1/2019 | Koch | B25J 9/162 |
| 2019/0287051 A1* | 9/2019 | Heinla | G06Q 50/28 |
| 2020/0051015 A1* | 2/2020 | Davis | G06K 19/0723 |
| 2020/0130893 A1* | 4/2020 | Väin | G07C 9/30 |
| 2020/0288895 A1* | 9/2020 | Bennet | B64C 39/024 |

* cited by examiner

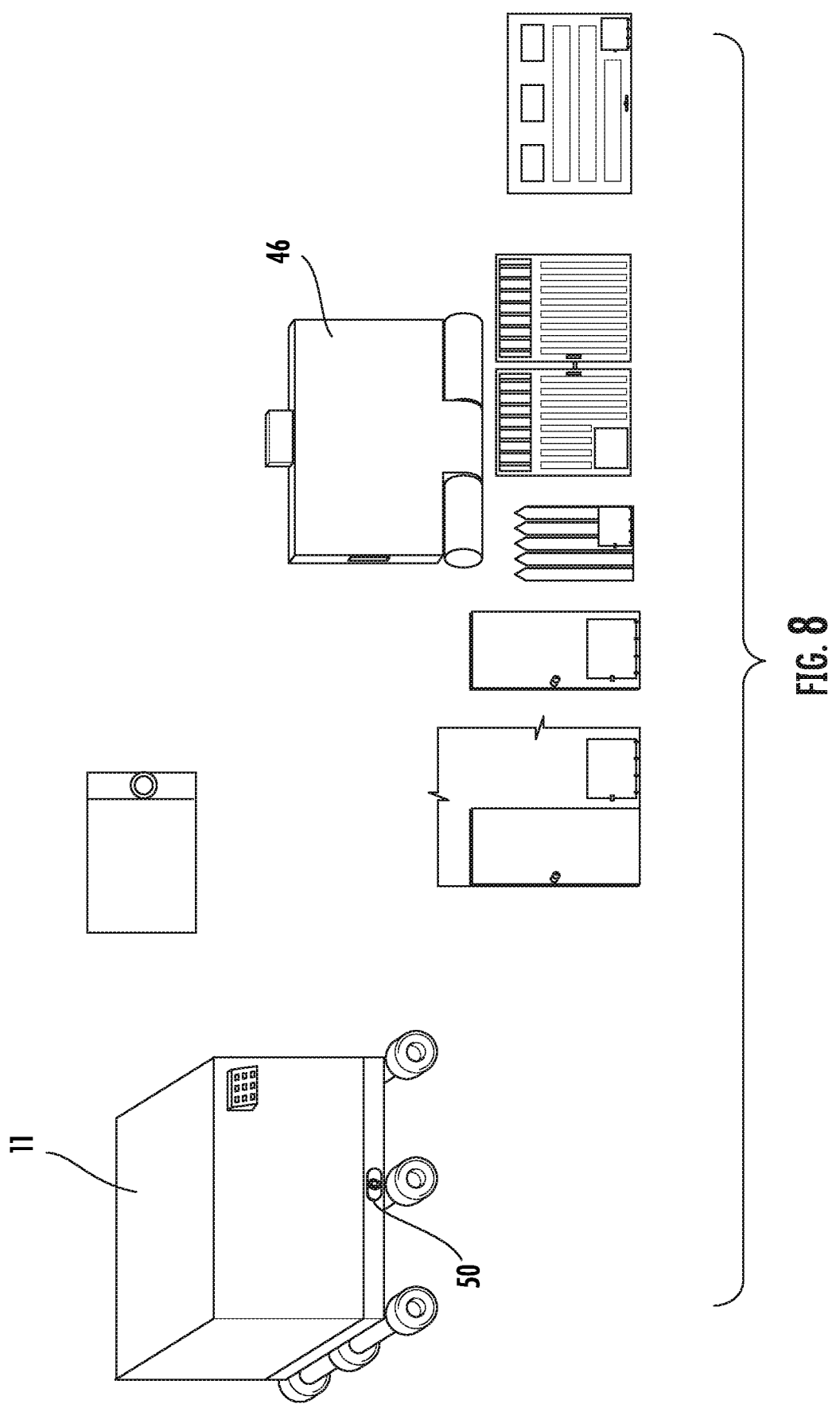

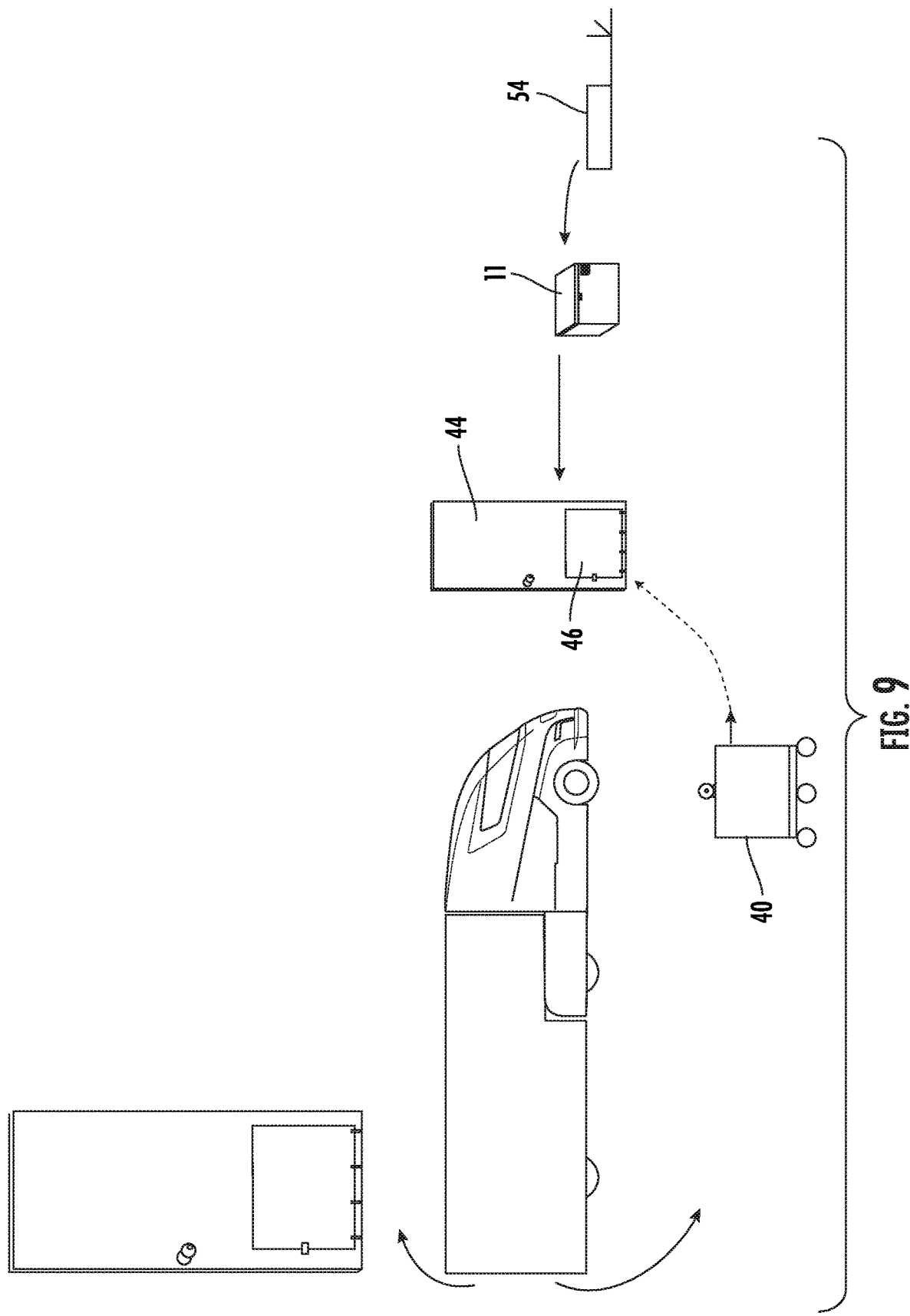

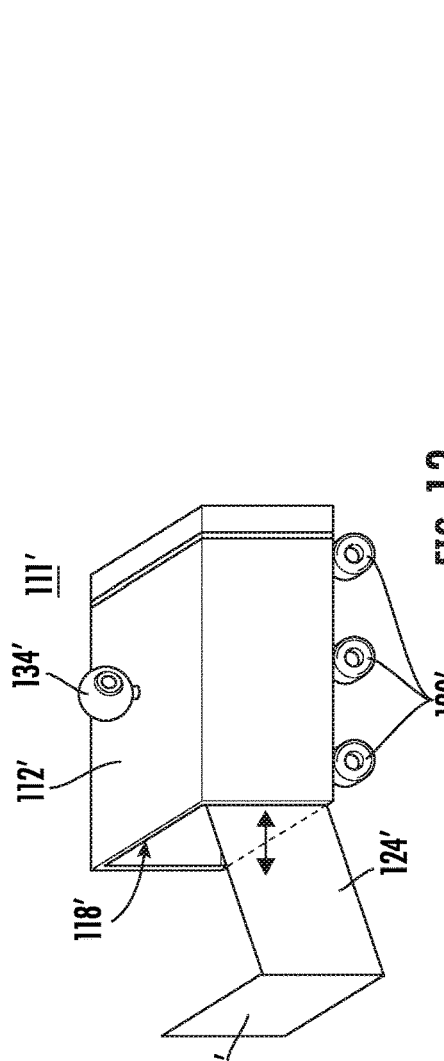
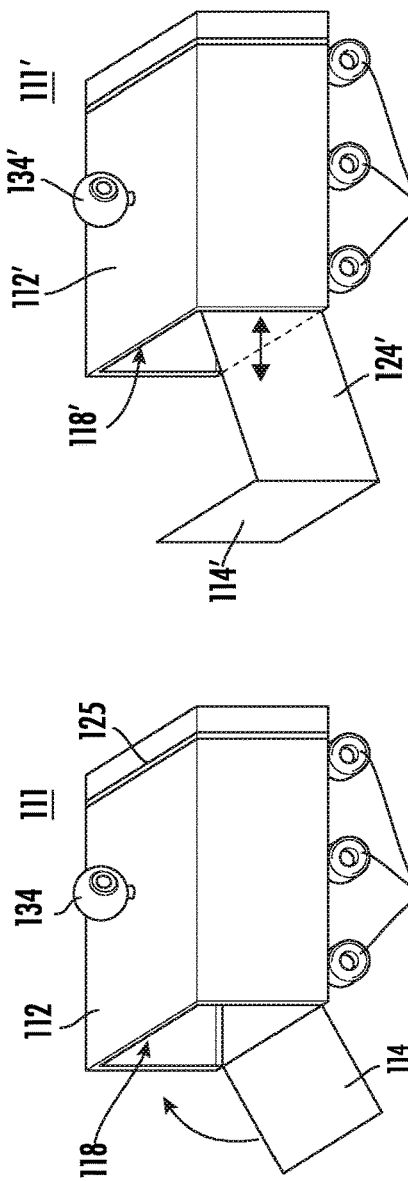
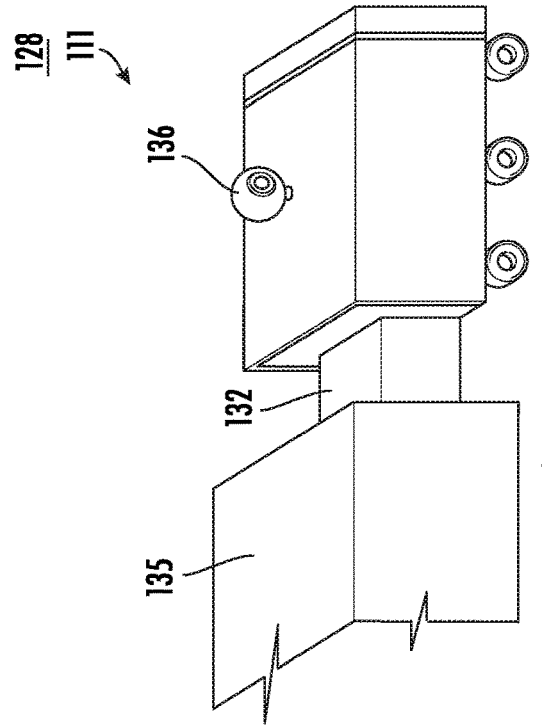

PARCEL DEPLOYING APPARATUS AND VEHICLE DELIVERY

CROSS-REFERENCE TO RELATED APPLICATION

This application claims the benefit of U.S. Provisional Application No. 62/861,960, filed 14 Jun. 2019 and U.S. Provisional Application No. 62/873,892, filed 13 Jul. 2019.

FIELD OF THE INVENTION

This invention relates to the alignment of delivery/pickup robots with a secure safe or robosafe alignment that includes "smart" electronics and apparatus and to the delivery/pickup by a smart parcel safe to vehicles and the like.

BACKGROUND OF THE INVENTION

Hundreds of millions of parcels are processed, outgoing and incoming, to and from homes and businesses yearly. Many of the parcels are lost, stolen, or damaged. Many require a signature or for someone to be present at the point of interaction. Parcels may be held, requiring multiple delivery/pick-up attempts, wasting time driving and waiting in long lines, wasting fuel and contributing to negative environmental effects from excessive use of fuel and packaging materials. Perishable parcels such as groceries, medications, restaurant food deliveries, electronics, flowers, wine and more, are either undeliverable or at risk of being damaged or destroyed by being exposed to the elements such as heat, cold, rain, wind, sun, ice and other inclement weather and extreme conditions and may likely jeopardize the efficacy of medication, potentially rendering it useless, harmful or even fatal for use. It may spoil food, placing, especially the very young, immuno-compromised and the elderly, people at risk for poisoning.

A smart parcel safe which overcomes many or all of these difficulties is described in U.S. Pat. No. 10,039,401, entitled "Smart Parcel Safe", issued 7 Aug. 2018. Mention is made in the patent of delivery services, such as Fedex, UPS, USPS, food delivery services, flower deliveries, and the like, however this generally entails or involves a delivery person. Much additional time and expense are automatically added when a delivery person is involved in the procedure. To overcome this problem, the present invention anticipates a procedure and apparatus for delivering/picking-up parcels directly from a vehicle or other vehicle.

At the present time much research and development has gone into delivery robots and, accordingly, in accordance with the present invention, parcel safes are disclosed that are specifically designed for robotic delivery. Here it must be understood that the term "robot" or "robotic' includes any and all robots, robotic drones, AI, artificial intelligence, autonomous deliveries and pickups, etc., as well as all experimental deliveries and pickups. In all instances it is important that the non-human, as well as any automated human assisted (e.g. there may be a human present for part of these functions for such things as a verification signature) delivery/pickup is able to manipulate (open, close, lock, unlock, motorize (e.g. make the safe move in any direction), engage movement, tracking, alarms, etc.) the parcel safe either directly or through some external communication. In some instances or areas, the delivery of certain goods (e.g. liquor, Marijuana, tobacco, etc.) may require an authorizing signature. In such situations it may be convenient to provide an app which has been pre-verified on the user's phone or other smart device. In such circumstances the app may be designed so that the owner (deliveree) simply applies a fingerprint, or signature, authorizing the delivery service to leave the delivery in the provided, locked safe.

It would be highly advantageous, therefore, to remedy the foregoing and other deficiencies inherent in the prior art.

Accordingly, it is an object of the present invention to provide new and improved robotic delivery/pickup procedures and apparatus in cooperation with a smart parcel safe.

It is another object of the present invention to provide a new and improved smart parcel safe that that can be remotely modified or adjusted to enhance non-human delivery/pickups.

It is another object of the present invention to provide new and improved procedures and apparatus for delivering/picking-up parcels directly from a vehicle or other vehicle.

It is another object of the present invention to provide new and improved procedures and apparatus for delivering/picking-up parcels directly without the need for the recipient to either be in the area or even to be home.

SUMMARY OF THE INVENTION

Briefly to achieve the desired objects and advantages of the instant invention a preferred parcel deploying apparatus is disclosed. The apparatus includes package receiving or delivering apparatus defining an enclosure with a plurality of walls, any or all of the plurality of walls being releasably locked to the package receiving or deploying apparatus by an externally controllable locking mechanism and movable from a closed orientation to an open orientation defining a first package receiving flat surface. A robot, including a body with controllably movable apparatus for horizontal aligning movements, is included. The body includes a wall releasably attached to the body for movement between a body closing orientation and a horizontal orientation defining a second package receiving flat surface. At least one of the package receiving or deploying apparatus and the robot body include package relocating apparatus which moves a package between a stored orientation and an extended orientation on one of the first package receiving flat surface and the second package receiving flat surface. The controllably movable apparatus is controllable to move the robot into alignment with a delivery position.

To further achieve the desired objects and advantages of the present invention parcel deploying apparatus is provided. The parcel deploying apparatus includes a robosafe which is an integrated robot and parcel safe. The robosafe includes a container defining an enclosure with at least one wall releasably locked to the container by an externally controllable locking mechanism and movable from a closed orientation to an open orientation defining a parcel receiving or deploying surface. Controllably movable apparatus is attached to the container of the robosafe. The controllably movable apparatus is designed and constructed to move the robosafe in any desired direction along a horizontal surface. A sensor and movement guide is positioned on a surface of the robosafe, the sensor and movement guide including internal electronics designed and constructed to provide a view of the position of the robosafe relative to the surroundings and a guide for movement of the robosafe in response to the controllably movable apparatus.

To further achieve the desired objects and advantages of the present invention a more specific method of delivering packages to a parcel safe or container is illustrated. The apparatus for accomplishing this method includes a robosafe, i.e. an integrated robot and parcel safe. The robosafe includes a container defining an enclosure with at least one wall releasably locked to the container by an externally controllable locking mechanism and movable from a closed orientation to an open orientation defining a parcel receiving or deploying surface. Controllably movable apparatus is attached to the container of the robosafe, the controllably movable apparatus designed and constructed to move the robosafe in any desired direction along a horizontal surface. A sensor and movement guide is positioned on a surface of the robosafe, the sensor and movement guide including internal electronics designed and constructed to provide a view of the position of the robosafe relative to the surroundings and a guide for movement of the robosafe in response to the controllably movable apparatus.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 8 is a front perspective view of an access door and some of the interacting components;

FIG. 9 illustrates various components and their interaction in a delivery/pickup process, in accordance with the present invention;

FIG. 12 is a perspective top view of a smart parcel safe according to the present invention;

FIG. 13 is a perspective top view of another smart parcel safe according to the present invention;

FIG. 14 is a perspective side view of procedures and apparatus for delivering/picking-up parcels directly from a vehicle or other vehicle in accordance with the present invention;

DETAILED DESCRIPTION OF THE DRAWINGS

Figure 1:
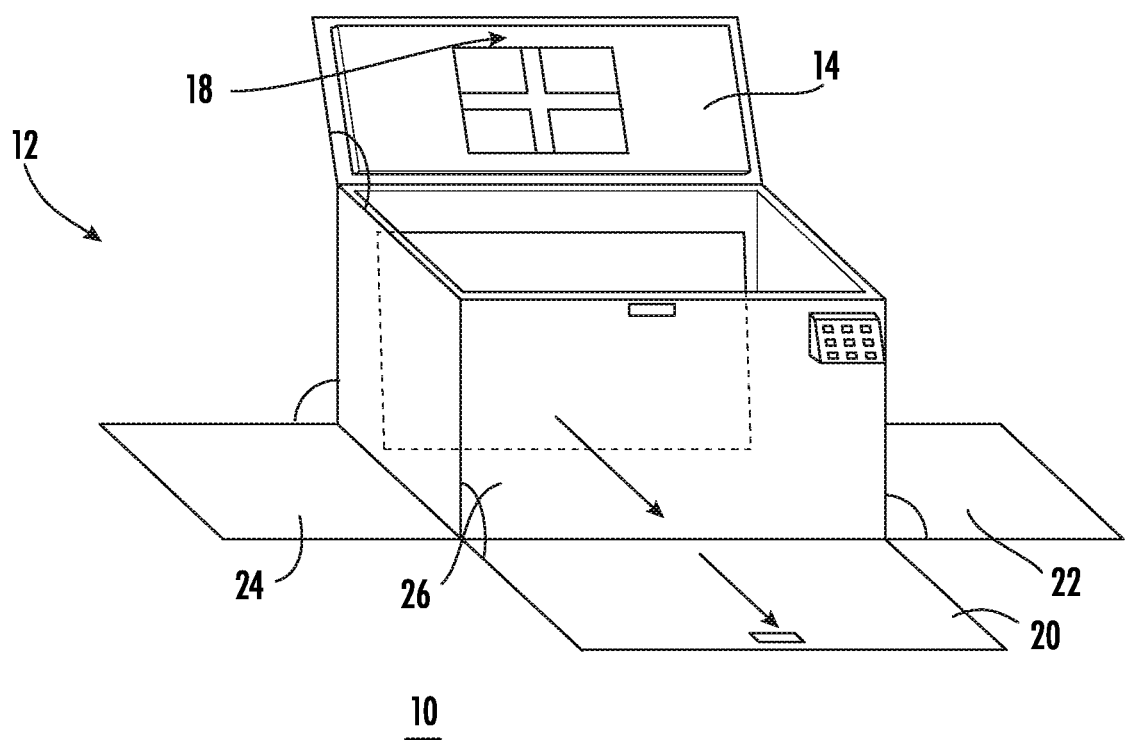
FIG. 1 is a perspective front view of a smart parcel safe according to the present invention.

Turning now to the drawings in which like reference characters indicate corresponding elements throughout the several views, attention is directed to FIG. 1 which illustrates a smart parcel safe 10 in accordance with the present invention. Safe 10 includes a main container 12 and a lid 14. In the present specific example, safe 10 is illustrated as a rectangularly shaped box, having an upwardly directed opening closed by lid 14. Also, lid 14 is releasably locked to container 12 by an externally controllable locking mechanism 18. It should be understood that container 12 is shown as rectangular, but can be provided in any convenient shape, size, styles, and includes various weights thicknesses, insulation, etc. Generally, it is anticipated that safe 10 will be provided in a variety of sizes and the particular size selected by a user/owner will be in accordance with their specific needs. For example, large for high use owners; medium for normal or generic users; and a smaller item (like a commercially available storage container) for apartments and the like.

While lid 14 is releasably locked to container 12 by externally controllable locking mechanism 18, it should be understood that any or all of the other walls of container 12, including front wall 20, right wall 22, left wall 24 and bottom 26 can be releasably locked to container 12 by an externally controllable locking mechanism, similar to mechanism 18. Depending upon the specific user and orientation during that use any or all of the sides, top, bottom might be designed for being opened externally.

As illustrated in FIG. 1 and explained in a co-pending U.S. patent application Ser. No. 16/896,652, titled "PARCEL SAFE REMOTE VEHICLE ALIGNMENT SYSTEM" filed of even date herewith on Jun. 9, 2020, generally lid 14 will need to open to a position at least perpendicular to container 12, and preferably an additional ten or twenty degrees, so that drones can drop deliveries and pick up deliveries. However, drone deliveries and pickups are only one procedure and the present disclosure deals primarily with other robotic deliveries and pickups, although in many of the examples disclosed herein any and all robots, robotic drones, AI, artificial intelligence, autonomous deliveries and pickups, etc. are included or may be included. Throughout this disclosure it should be understood that the term "robot" is generic and defined as including any one of robots, robotic drones, AI, artificial intelligence, autonomous deliveries and pickups.

Figure 2:
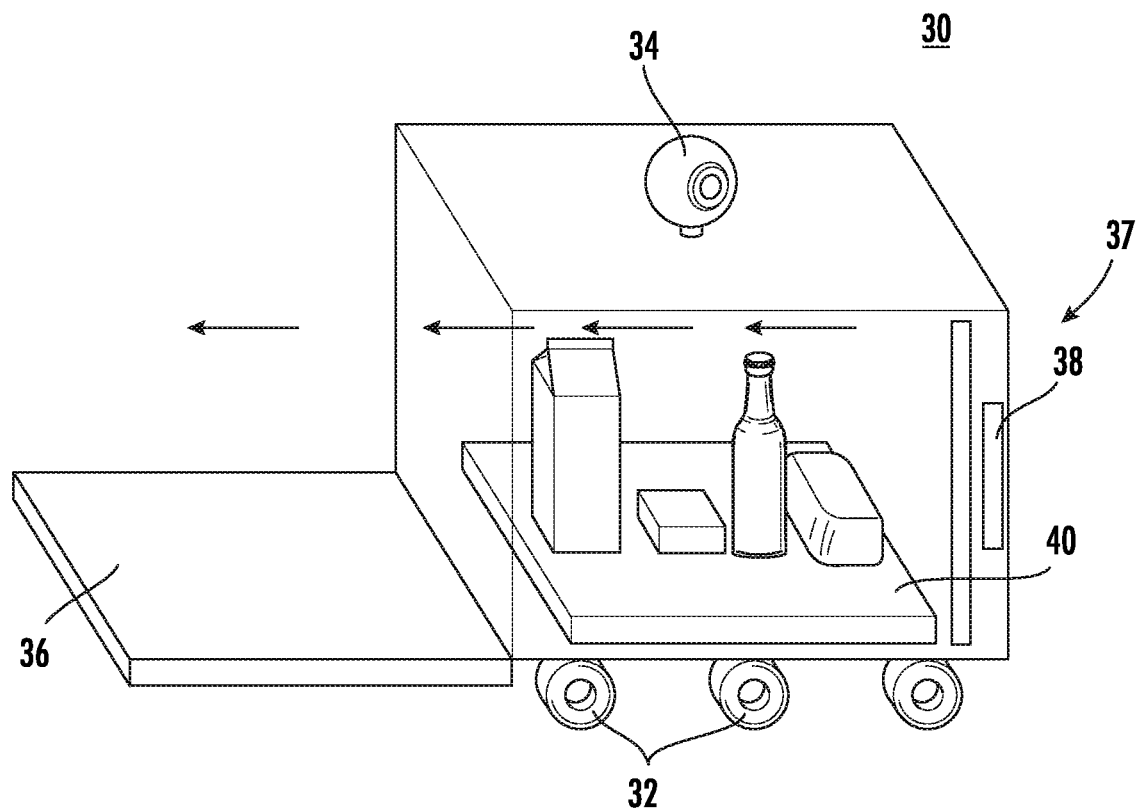
FIG. 2 is a perspective side view of a delivery robot designed to interact with the smart parcel safe of FIG. 1, potions thereof broken away to show inner operations.
Figure 3:
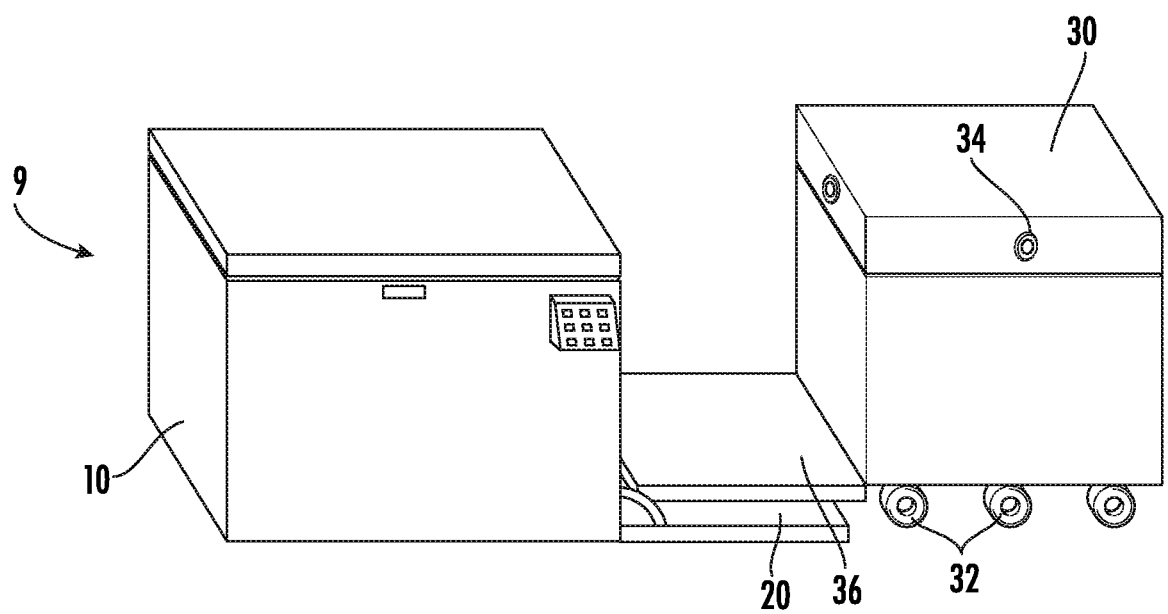
FIG. 3 is a perspective side view of the delivery robot of FIG. 2 interacting with the smart parcel safe of FIG. 1.

Turning now to FIGS. 2 and 3, a delivery robot 30 designed to interact with package receiving or deploying apparatus 9 is illustrated. Upon a careful review of the following disclosure it will be clear to the artisan that the term "package receiving or deploying apparatus" includes smart parcel safe 10, pickup and delivery vehicles, lockers, mail boxes, etc. Because smart parcel safe 10 is the preferred package receiving or deploying apparatus, smart parcel safe 10 is used in most of the following examples but in any specific example any of package receiving or deploying apparatus 9 can be substituted.

FIGS. 2 and 3 specifically illustrate smart parcel safe 10 of FIG. 1, as package receiving or deploying apparatus 9 in accordance with the present invention. Robot 30 is a structure on wheels 32 for movement into an aligned position with safe 10. Two or more of wheels 32 are controllably driven by internal electric motors (not visible) to move robot 30 in any desired direction along a horizontal surface, such as a floor, etc. A camera/sensor 34 on the upper surface of robot 30 provides a view of the position of robot 10 relative to the surroundings and provides a guide for the movement of robot 30. This view is used by internal electronics to move robot 10 into the desired delivery position, in this specific example, in alignment with front wall 20 of safe 10. It will be understood that controllably driven wheels 32 come within the generic definition of "controllably movable apparatus", which also includes apparatus moving robotic drones, AI, artificial intelligence, etc. in a well-known manner.

Once robot 30 is in position, front wall 20 of safe 10 is unlocked and rotated into a horizontal orientation. A front wall 36 (or other flat surface) of robot 30 moves into a horizontal ramp-like orientation overlying the horizontally oriented front wall 20 of safe 10. Package relocating apparatus 37 (defined as apparatus moving a package into a convenient position for further operations) is included in at least one of robot 30 and package receiving or deploying apparatus 9. In the preferred example, package relocating apparatus 37 includes a laterally movable wall 38 at the rear of robot 30 which in a preferred embodiment is movable in a plunger-like fashion to move a parcel 40 from the inner opening of robot 30 across front wall 36 and into the central opening of container 12 of safe 10, i.e. an extended orientation. Once the delivery is completed, the laterally movable wall 38 returns to a stored position adjacent the rear wall of robot 30, front wall 36 returns to its normal position, and front wall 20 of safe 10 is returned to its upright orientation and is locked in place.

Alternatively, front wall 36 (or other flat surface) of robot 30 is moved into a horizontal ramp-like orientation overlying the horizontally oriented front wall 20 of safe 10 with safe 10 in a package delivering/deploying mode of operation. A laterally movable wall at the rear of safe 10 is movable in a plunger-like fashion to move a parcel from the inner opening of safe 10 onto front wall 36 (or other flat surface) of robot 30 in an extended orientation. Front wall 36 (or other flat surface) of robot 30 is then moved into the closed orientation, which moves the package into robot 30. In a reverse operation, the horizontally oriented front wall 20 of safe 10, with safe 10 in a package receiving mode of operation, is moved into a horizontal ramp-like orientation overlying front wall 36 (or other flat surface) of robot 30. A laterally movable wall at the rear of robot 30 is movable in a plunger-like fashion to move a parcel from the inner opening of robot 30 onto front wall 36 (or other flat surface) of safe 10 in an extended orientation. Front wall 20 (or other flat surface) of safe 10 is then moved into the closed orientation, which moves the package into safe 10. Thus, in an extended orientation of package relocating apparatus, a package is moved into a convenient position for further operations.

Figure 4:
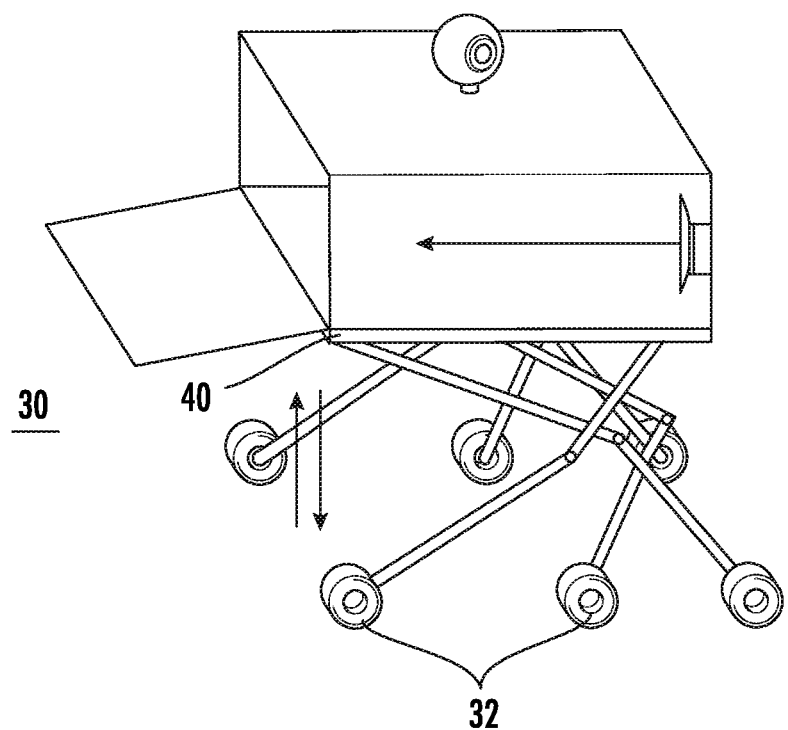
FIG. 4 is a perspective front view of the delivery robot of FIG. 2, illustrating additional details.
Figure 5A:
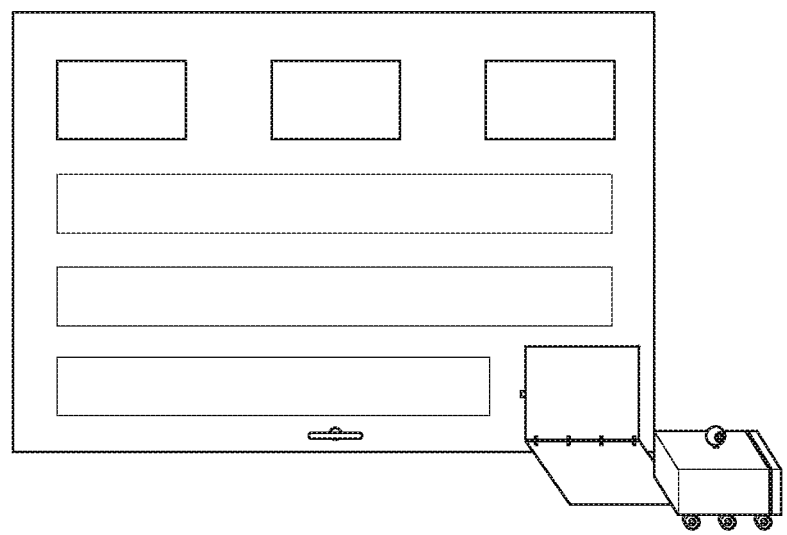
FIGS. 5A-5E illustrate several examples of potential permanent positions of the smart parcel safe of FIG. 1.
Figure 5B:
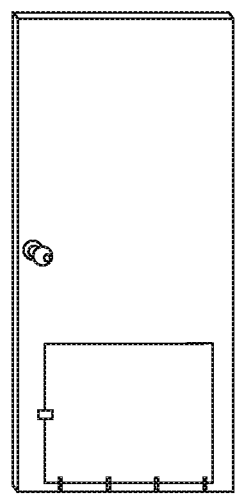
Figure 5C:
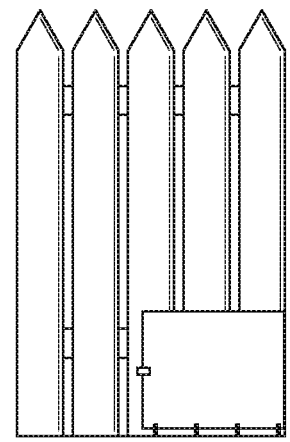
Figure 5D:
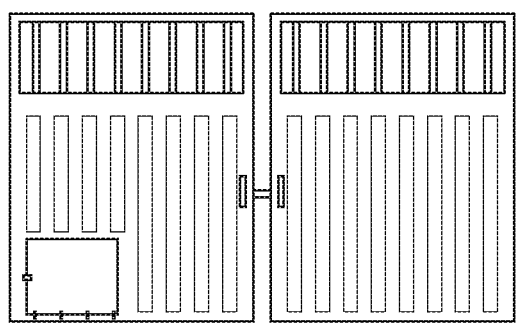
Figure 5E:
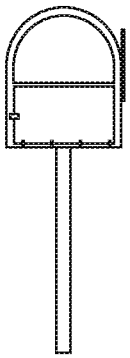

It will be understood that safe 10 may be permanently or temporarily positioned in any of a large variety of orientations, generally for the convenience of the user/owner or because of a specific use. A variety of potential permanent or temporary positions for safe 10 are illustrated in FIG. 5A a garage door, FIG. 5B a house or apartment door, FIG. 5C a yard fence, FIG. 5D a yard gate, FIG. 5E a mail box, etc. In order to allow robot 30 to deliver/pickup parcels from any of the various possible orientations it will generally be convenient to provide robot 30 with a base or housing 40 for wheels 32 which extends or scissors vertically upward, as illustrated in FIG. 4, and collapses into the normal or lowered position illustrated in FIG. 3.

Figure 6:
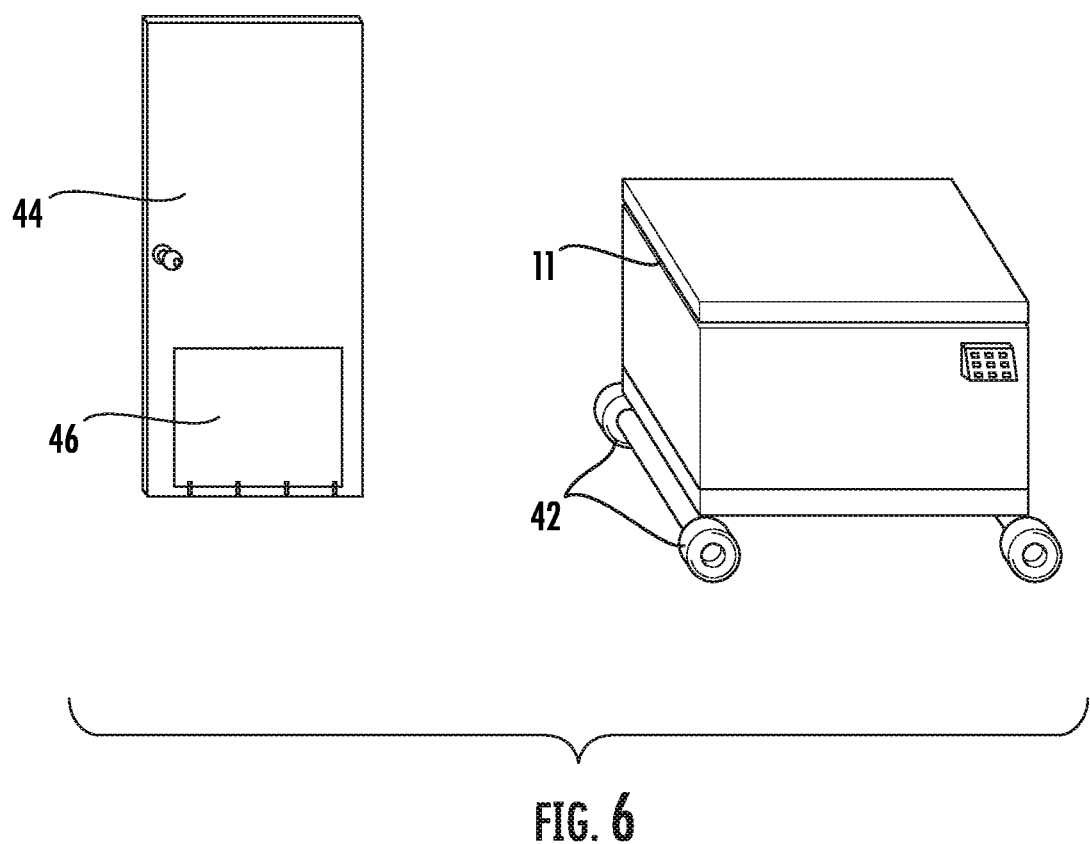
FIG. 6 is a perspective front view of the delivery robot of FIG. 2 in combination with an access door and docking station.

In one potential modification of safe 10, illustrated in FIG. 6, controllably driven wheels 42 are provided and safe 10 is actually integrated into the robot, as a single component, for pickup and delivery purposes. For purposes of this disclosure, the integrated combination of safe 10 and robot 30 will be generically referred to as a "robosafe" for convenience of understanding and is designated 11. In this example, robosafe 11 is normally positioned at a docking station for charging, etc. to one side of a normal access door 44 (for an apartment or the like). A releasable rectangular opening 46 is provided in access door 44 which mates with a side wall (e.g. side wall 22) of robosafe 11. It will be understood that two or more of wheels 42 are controllably driven by internal electric motors (not visible) to move robosafe 11 in any desired direction along a horizontal surface, such as a floor, etc.

Figure 7A:
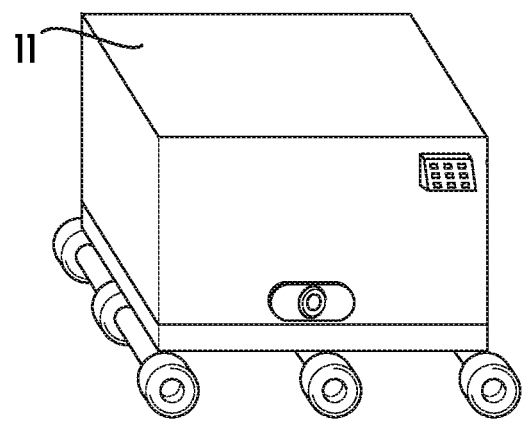
FIGS. 7A and 7B illustrate the smart parcel safe of FIG. 1 and a side view, portions thereof broken away, showing the interaction of the delivery robot of FIG. 2 with the smart parcel safe of FIG. 7A.
Figure 7B:
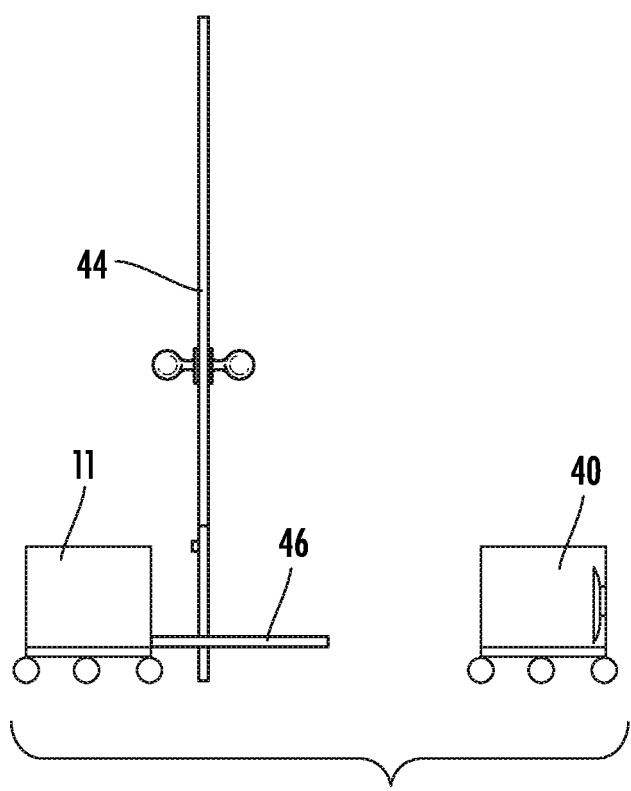

In operation and referring additionally to FIGS. 7a and 7B, robosafe 11 leaves the docking station and moves into alignment with opening 46. Opening 46 is hinged to rotate outwardly and downwardly to form a flat horizontal surface in cooperation with side 22 of robosafe 11, thus robosafe 11 can align with opening 46 similar to the alignment illustrated in FIG. 3. Once a delivery or pickup is completed, robot 40 leaves, opening 46 returns to a closed and locked position and robosafe 11 returns to its normal docking position.

In operations where robosafe 11 moves from a docking position to alignment with an opening 46, robosafe 11 includes sensors 50 (FIG. 8) which can receive external signals from any one or all of sensors in door opening 46, robot 40, some other external source of communication, etc. In applications where door opening 46 includes sensors and/or signaling devices, batteries may be included internally in door opening 46. Depending upon the specific application and referring additionally to FIG. 9, robot 40 may be carried to a position in the area of a drop or pickup by a delivery truck 52 which may be a driverless vehicle. Either robot 40, delivery truck 52 or some other external communication may send a signal to either door opening 46 or directly to robosafe 11. In either case, signals will be exchanged between door opening 46 and robosafe 11. As explained above, robosafe 11 moves from docking station 54 into alignment with door opening 46, side wall 22 drops, opening door opening 46, and robot 40 moves into alignment with door opening 46, drops the front wall, and pushes a delivery into door opening 46 and robosafe 11. Robot 40 then returns to delivery truck 52 and robosafe 11 returns to docking station 54, while door opening 46 closes and locks.

Figure 10:
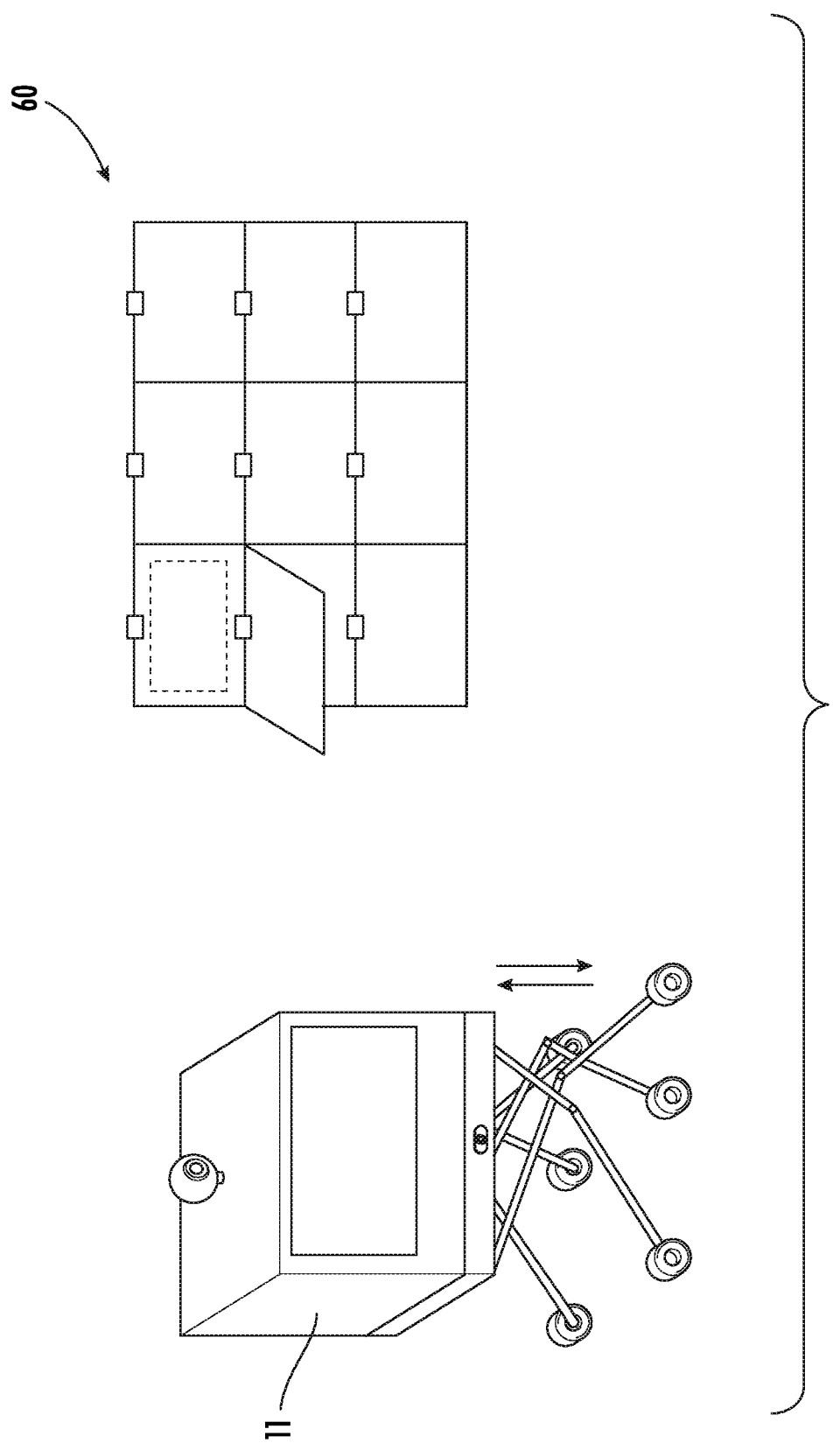
FIGS. 10 and 11 illustrate the interaction in a delivery/pickup process between the delivery robot of FIG. 2 with a locker system.
Figure 11:
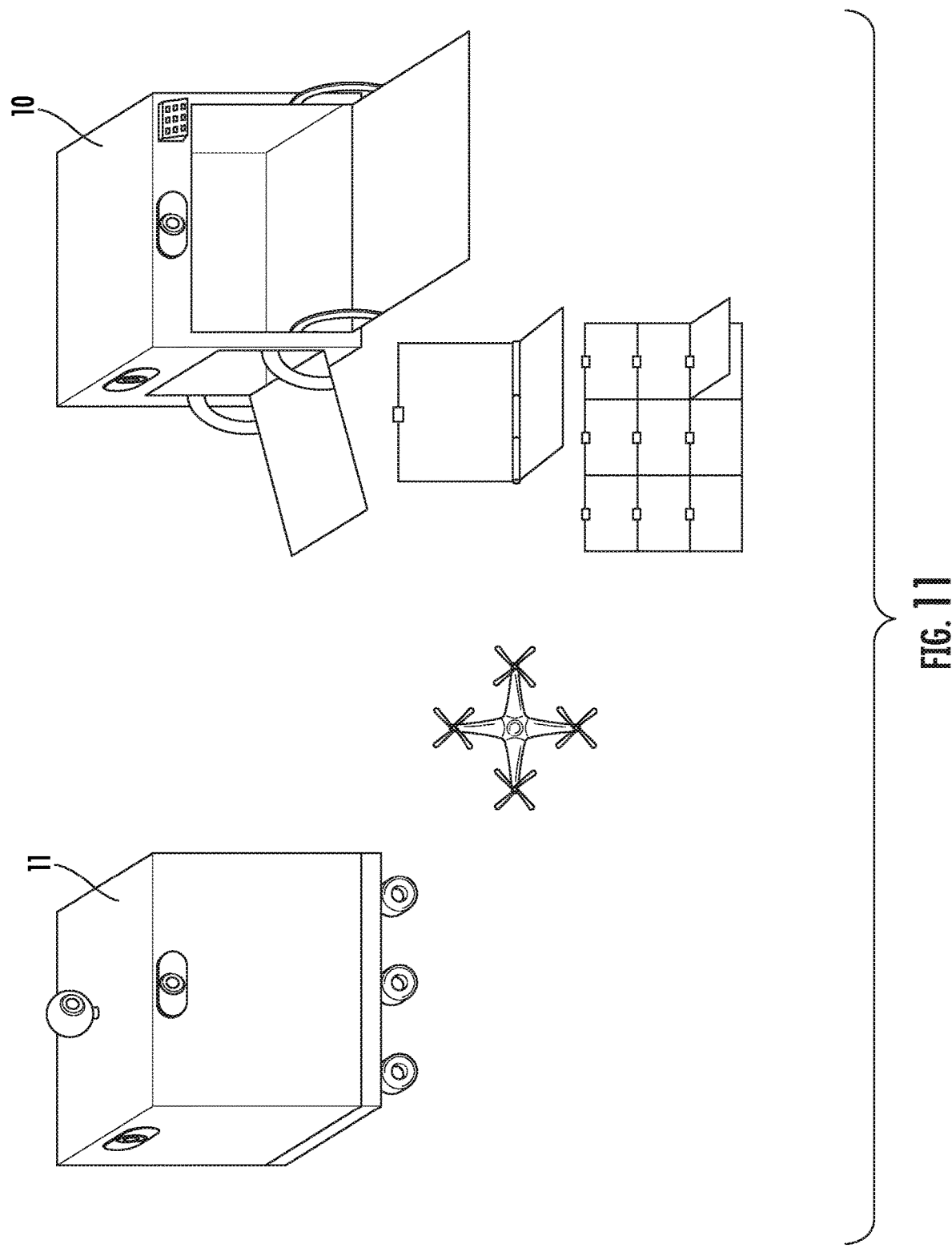

Turning to FIGS. 10 and 11, the smart parcel safe can be provided in the form of one or more lockers 60. In this example, locker or lockers 60 have a front door that can be unlocked and dropped into a horizontal orientation. Robot 40 is then aligned with the specific locker and a delivery or pickup is made generally as described above (e.g. FIG. 3). In this specific example, lockers 60 may be temperature controlled so that each locker is at an assigned temperature and once a delivery or pickup is completed the specific locker is closed, locked, and returned to the assigned temperature.

Referring specifically to FIG. 12, a robosafe 111 in accordance with the present invention is illustrated. Robosafe 111 includes a main container 112 and a side wall 114. In the present specific example, robosafe 111 is illustrated as a rectangularly shaped box, having an outwardly directed opening closed by side wall 114. Also, side wall 114 is releasably locked to container 112 by an externally controllable locking mechanism 118. It should be understood that container 112 is shown as rectangular, but can be provided in any convenient shape, size, styles, and includes various weights thicknesses, insulation, etc. Also, while side wall 114 is illustrated as an entrance to container 112 for purposes of explanation, it should be understood that any or all of the other side walls and the top may be releasably opened for purposes of entrance to container 112 in any given application. Generally, it is anticipated that robosafe 111 will be provided in a variety of sizes and the particular size selected by a user/owner will be in accordance with their specific needs. For example, large for high use owners; medium for normal or generic users; and a smaller item (like a commercially available storage container) for apartments and the like.

While side wall 114 is releasably locked to container 112 by an externally controllable locking mechanism 118, it should be understood that any or all of the other five walls of container 112, including the front wall, the right wall, the left wall and the top can be releasably locked to container 112 by an externally controllable locking mechanism, similar to mechanism 118. Depending upon the specific user and safe orientation during that use any or all of the sides, top, bottom might be designed for being opened externally. Further, it should be understood that any of the six sides of container 112 can be configured to open outward, inward, upward or downward, sideways, sliding extending, pulling, etc. and container 112 could include an internal bucket or carton, or any internal bag or container that can be lifted out, placed in, or exchanged with delivery.

In this specific example, robosafe 111 is movable between two or more locations. To provide the movable feature, wheels 120 are mounted on the bottom surface. Two or more of wheels 120 are controllably driven by internal electric motors (not visible) to move robosafe 111 in any desired direction along a horizontal surface, such as a floor, etc. A camera/sensor 134 on the upper surface of robosafe 111 provides a view of the position of robosafe 111 relative to the surroundings and provides a guide for the movement of robosafe 111. This view is used by internal electronics to move robosafe 111 into the desired delivery position, in this specific example, in alignment with docking stations, etc. Wheels 120 may be mounted in a variety of different ways, depending upon the ultimate use or operation of robosafe 111. In one preferred embodiment, wheels 120 are mounted to the lower surface of robosafe 111 by means of scissoring apparatus (see FIG. 5) which can be activated to raise and lower robosafe 111 virtually anywhere from inches to feet.

An additional feature that can be included in robosafe 111, depending upon the usage or operation thereof, is package relocating apparatus, in this example a plunger type of device 125 that can be activated to push parcels out of container 112 onto lowered side wall 114 for convenient pickup. In some specialized applications a parcel receiving component, such as a tray, bin, bag, bucket, may be used to hold or receive a parcel or parcels, and the entire parcel receiving component is exchanged. Plunger type of device 125 is illustrated as being connected to the rear wall of container 112 for activation toward and away from the front wall (side wall 114). It should be understood, however, that plunger type of device 125 might be associated with any wall or surface of container 112 as long as it is situated to move parcels inside of container 112 toward and out of an opening provided for that purpose.

Referring to FIG. 13, another example of a robosafe 111' is illustrated in accordance with the present invention. Components of robosafe 111' that are similar to components of robosafe 111, are designated with numbers having a prime (') added to indicate the different example. Also, similar components have similar uses and may be similarly modified or selected. Robosafe 111', for package relocating apparatus instead of plunger type of device 125, has a drawer 124', one end of which is illustrated as side wall 114', and slides out of container 112' to allow parcels situated on drawer 124' to be removed. Alternatively. Drawer 124' can be slide out of container 112' to receive parcels and then withdrawn to hold the parcels safely in robosafe 111'. In some specific applications, drawer 124' may be removed completely and replaced or exchanged during the delivery/pickup procedure. As described above, side wall 114' is releasably locked to container 112' by an externally controllable locking mechanism 118'.

Turning now to FIG. 14, procedures and apparatus, generally designated 128, are illustrated for delivering/picking-up parcels directly from a vehicle 130 (generally referred to as an electric vehicle) or other device (this could also be a drone, robots, robotic drones, AI, artificial intelligence, autonomous deliveries and pickups, etc.) in accordance with the present invention. In this specific example, robosafe 111 (generally similar in part to smart parcel safe 10 in FIG. 1) is employed as a movable parcel safe (i.e. a robosafe) but it should be understood that this is only one example. Robosafe 111 is designed and constructed to normally electrically couple to a docking station 132 with robosafe 111 in a coupling orientation adjacent docking station 132 (illustrated in FIG. 12). Docking station 132 is preferably situated on a wall 135 in a convenient area in a house, garage, etc. Docking station 132, which is electrically powered by any of normal house power, solar power, battery, etc., maintains robosafe 111 in a fully charged and ready to operate condition.

Apparatus 128 further includes a safe access door 140 mounted in a normal house or garage door 142. Safe access door 140 is mounted at the bottom of door 142 and in this specific example is hinged along an upper edge 144 so it can swing outwardly (or inwardly) to provide a smooth path through door 142 from one side to the other. It will be understood that safe access door 140 could alternatively open by sliding to one side, or may include an external wall that closes and locks and an internal wall that is movable, back and forth. Safe access door 140 includes an externally controllable locking mechanism 146 that normally prevents safe door 140 from opening and only allows operation when locking mechanism 146 is externally operated for parcel delivery or shipping.

In some specific applications, such as apartments and the like, robosafe 111 might connect directly to safe access door 40 so that an internal opening of robosafe 111 is accessible when safe access door 140 is opened. Thus, parcels being delivered could be inserted directly into robosafe 111 from outside door 142, rather than being pushed across lowered side walls and the like. Also, because in most instances grocery stores make deliveries in bins, robosafe 111 can be designed to match the size and shape of grocery store bins, i.e. a bin or bins can be easily slide into and out of safe 110. In one specific embodiment, when a movable or unlockable wall opens an internal empty bin/tray (previously delivered) will partially move out to connect with a delivery vehicle delivery system. The delivery system will take the empty bin/tray and deposit a new full bin/tray in its place. In some applications the movable or unlockable wall might be one or more drawers capable of receiving one or more bins simultaneously or from multiple different delivery systems.

In the operation of apparatus 128, when vehicle 130 arrives in the street outside of door 142 in accordance with a prearranged schedule, a signal is communicated to robosafe 111, either directly or through docking station 132. Safe door 140 is unlocked by a signal from either vehicle 130 or docking station 132 (robosafe 111) and robosafe 111 is activated to leave docking station 132 and proceed to safe door 140. Robosafe 111 includes tracking and homing device 136 situated on the upper surface of robosafe 111 to guide robosafe 111 along a predetermined path, including safe door 140 and a designated spot adjacent the street in front of door 142. At safe door 140, either robosafe 111 can simply push it open and exit through door 142 or an opening mechanism can be associated with door 140 to automatically open door 140. Robosafe 111 then proceeds to vehicle 130 and either opens a side wall (e.g. side wall 114) or extends a drawer (e.g. drawer 124') so that a delivery system in vehicle 130 can either deposit or pick up a parcel or parcels on opened side wall 114 or in drawer 124'. Once a parcel or parcels are received or delivered, robosafe 111 proceeds back through safe door 140 and into docking communication with docking station 132. Door 140 is locked and vehicle 130 proceeds on its path.

Figure 15:
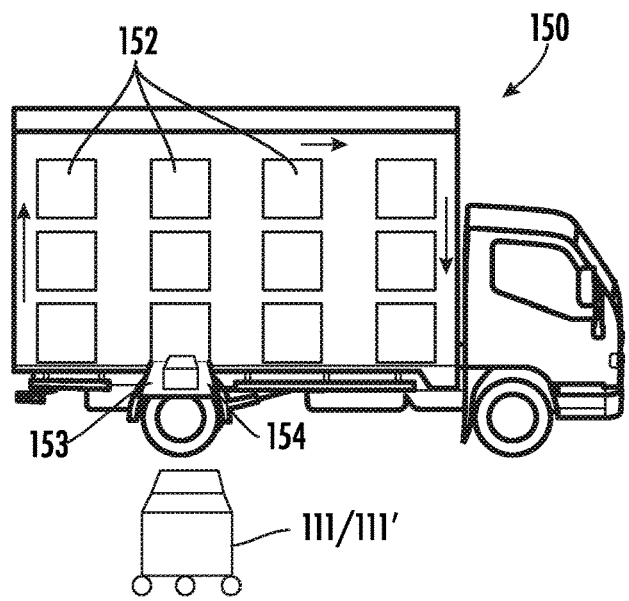
FIG. 15 is a front perspective view of a first embodiment of a parcel delivery vehicle delivering a parcel to a smart parcel safe according to the present invention.
Figure 16:
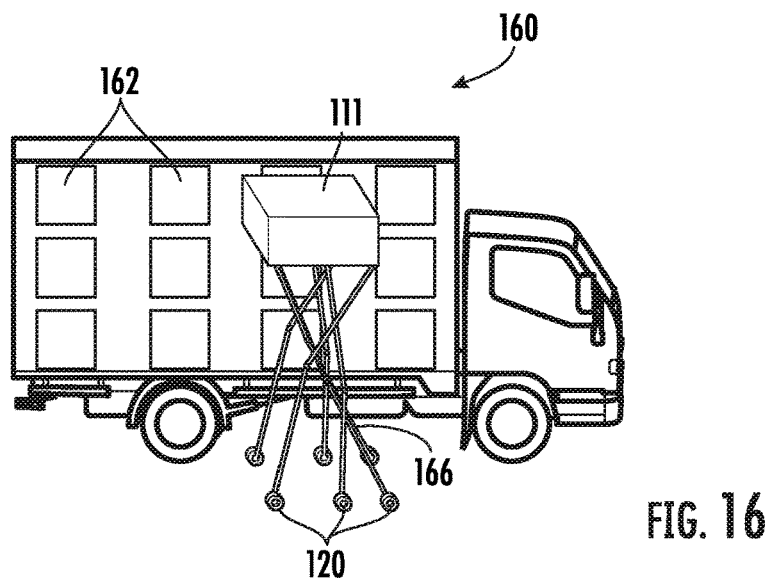
FIG. 16 is a front perspective view of another embodiment of a parcel delivery vehicle delivering a parcel to a smart parcel safe according to the present invention.
Figure 17:
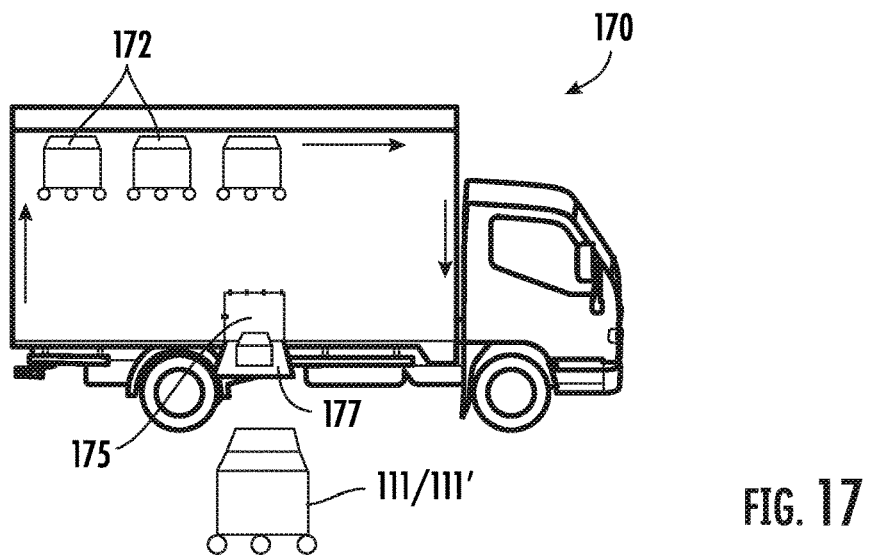
FIG. 17 is a front perspective view of another embodiment of a parcel delivery vehicle delivering a parcel to a smart parcel safe according to the present invention.

It should be understood that at least one component of the procedures and apparatus 128 for improving delivery/pickup procedures is the apparatus for transferring parcels between vehicle 130 and robosafe 110 or 110'. To this end several different apparatus are illustrated in FIGS. 15, 16, and 17. It should also be understood that these various apparatus are simply examples and many more and different structures may be devised by those skilled in the art.

Referring specifically to FIG. 15, a vehicle 150 is illustrated as one potential embodiment for vehicle 130 in procedures and apparatus 128 above. Vehicle 150 includes a plurality of individual containers or lockers 152 which are mounted on apparatus within vehicle 150 that rotates the entire assembly in a clockwise (or ccw) direction to position a specific one of the individual containers or lockers in alignment with an exterior opening 153 through which a parcel can be pushed out onto an extended wall 154 and then onto an extended side wall 114 or drawer 124' of a waiting robosafe 111 or 111'. Alternatively, a parcel can be pushed off of extended wall 114 onto extended wall 154 of vehicle 150. Vehicle 150 can then retract wall 154, moving the parcel into the selected container or locker 152. Here it should be understood that in all delivery vehicles internal bins, containers, etc. generally can be removed and replaced, swapped out, removing the empty internal bin and replacing it with a full bin, tray, bucket, basket, etc. Robosafe 111 or 111' can then return through safe door 140 to docking station 132.

Referring specifically to FIG. 16, a vehicle 160 is illustrated as another potential embodiment for vehicle 130 in procedures and apparatus 128 above. Vehicle 160 includes a plurality of fixed containers or lockers 162 which open to the exterior for delivering or receiving a parcel. In this specific embodiment robosafe 111 includes wheels 120 mounted to the lower surface of robosafe 111 by means of scissoring apparatus 166 which can be activated to raise and lower robosafe 111 into alignment with a specific container or locker 162. Once aligned, parcels can be simply pushed into or out of robosafe 111 or the specific container or locker 162, depending upon whether the parcels are being delivered or received for shipment. Robosafe 111 or 111' can then retract scissoring apparatus 166 and return through safe door 140 to docking station 132.

Referring specifically to FIG. 17, a vehicle 170 is illustrated as one potential embodiment for vehicle 130 in procedures and apparatus 128 above. Vehicle 170 includes a plurality of individual rovers 172 which can be moved into alignment with an exterior opening 175. In conjunction with exterior opening 175, a wall or panel 177 drops into a generally horizontal position and a selected or specific rover 172 can move onto wall or panel 177 and then onto the ground where it can move into alignment with a waiting robosafe 111 or 111'. Rover 172 can then move a parcel or parcels it is carrying onto an extended wall 114 or drawer 124', after which rover 172 will return through opening 175 and wall or panel 177 will close. Robosafe 111 or 111' can then return through safe door 140 to docking station 132.

It should be understood that all externally controllable locking mechanisms 118, safe access door 140, and all other controllable components, movements, etc., can be operated from different ones of the various components through WiFi, Bluetooth, magnetic, mechanical, or sound waves. Also, in the movement of robosafe 111 from docking station 132, one or more guiding stations may be provide along the path, each of which could guide for a predetermined distance along the path.

Thus, new and improved parcel deploying apparatus and procedure is disclosed for use with a smart safe or robosafe. The new and improved parcel deploying apparatus and procedure in cooperation with a smart parcel safe or robosafe allows and enhances robot deliveries and pick-ups. Also a new and improved smart parcel safe delivery system or operation is disclosed. Further, new and improved robotic delivery/pickup procedures and apparatus in cooperation with a smart parcel safe or robosafe are disclosed. The new and improved delivery/pickup procedures and apparatus in cooperation with a smart parcel safe or robosafe allows and enhances deliveries and pick-ups. The present invention provides new and improved procedures and apparatus for delivering/picking-up parcels directly without the need for the recipient or delivery people to either be in the area or even to be home. Also the new and improved delivery/pickup procedures and apparatus greatly reduce time and expense that are automatically added when a delivery person is involved in the procedure.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Parcel deploying apparatus comprising:
   package receiving and/or delivering apparatus defining an enclosure with a plurality of walls, any or all of the plurality of walls being releasably locked to the package receiving and/or deploying apparatus by an externally controllable locking mechanism and movable from a closed orientation to an open orientation defining a first package receiving flat surface;
   a robot including a body with controllably movable apparatus for aligning movements, the body including a wall releasably attached to the body for movement between a body closing orientation and a horizontal orientation defining a second package receiving flat surface;
   at least one of the package receiving and/or deploying apparatus and the robot body including package relocating apparatus which moves a package between a stored orientation and an extended orientation on one of the first package receiving flat surface and the second package receiving flat surface;
   the controllably movable apparatus controllable to move the robot into alignment with a delivery position; and
   wherein the package receiving and/or deploying apparatus and the robot are integrated into a robosafe wherein the package receiving and/or delivering apparatus enclosure and the robot body are a common single component.

2. The parcel deploying apparatus as claimed in claim 1 wherein the package receiving and/or deploying apparatus includes a smart parcel safe.

3. The parcel deploying apparatus as claimed in claim 1 wherein the controllably movable apparatus includes two or more wheels controllably driven by internal electric motors to move the robot in any desired direction along a horizontal surface.

4. The parcel deploying apparatus as claimed in claim 3 wherein the package receiving and/or deploying apparatus includes a vertically movable housing including the two or more wheels attached to the housing by vertically upward extending or scissoring apparatus which collapses into a normal or lowered position.

5. The parcel deploying apparatus as claimed in claim 1 wherein the package relocating apparatus of the robot body includes a remotely controllable inner wall movable between a stored orientation and an extended orientation in which the inner wall moves from the stored orientation horizontally across the robot body and the second package receiving flat surface.

6. The parcel deploying apparatus as claimed in claim 1 wherein the package relocating apparatus of the package receiving and/or deploying apparatus includes a remotely controllable inner wall movable between a stored orientation and an extended orientation in which the inner wall moves from the stored orientation horizontally across the package receiving and/or deploying apparatus and the first package receiving flat surface.

7. The parcel deploying apparatus as claimed in claim 1 wherein the robot includes one of a robot, a robotic drone, AI device, artificial intelligence, or autonomous deliveries and pickups.

8. The parcel deploying apparatus as claimed in claim 1 wherein the package receiving and/or deploying apparatus enclosure and the robot body are integrated into a container with at least one wall releasably locked to the container by an externally controllable locking mechanism and movable from a closed orientation to an open orientation defining a parcel receiving or deploying surface.

9. The parcel deploying apparatus as claimed in claim 1 further including a sensor and movement guide positioned on a surface of the container, the sensor and movement guide including internal electronics designed and constructed to provide a view of the position of the parcel deploying apparatus relative to the surroundings and a guide for movement of the parcel deploying apparatus in response to the controllably movable apparatus.

10. Parcel deploying apparatus comprising:
a robosafe including an integrated robot and parcel safe, the robosafe including a container defining an enclosure with at least one wall releasably locked to the container by an externally controllable locking mechanism and movable from a closed orientation to an open orientation defining a parcel receiving or deploying surface;
controllably movable apparatus attached to the container of the robosafe, the controllably movable apparatus designed and constructed to move the robosafe in any desired direction along a horizontal surface; and
a sensor and movement guide positioned on a surface of the robosafe, the sensor and movement guide including internal electronics designed and constructed to provide a view of the position of the robosafe relative to the surroundings and a guide for movement of the robosafe in response to the controllably movable apparatus.

11. The parcel deploying apparatus as claimed in claim 10 wherein the controllably movable apparatus includes a plurality of wheels attached to the container and two or more of the plurality of wheels controllably driven by internal electric motors to move the parcel receiving or deploying apparatus in any desired direction along a horizontal surface.

12. The parcel deploying apparatus as claimed in claim 10 further including a docking station designed and constructed to electrically couple to the robosafe with the robosafe in a coupling orientation adjacent the docking station.

13. The parcel deploying apparatus as claimed in claim 12 wherein the docking station is electrically powered by any of normal house power, solar power, or battery, and maintains the robosafe in a fully charged and ready to operate condition.

* * * * *